United States Patent Office 3,118,641
Patented Jan. 21, 1964

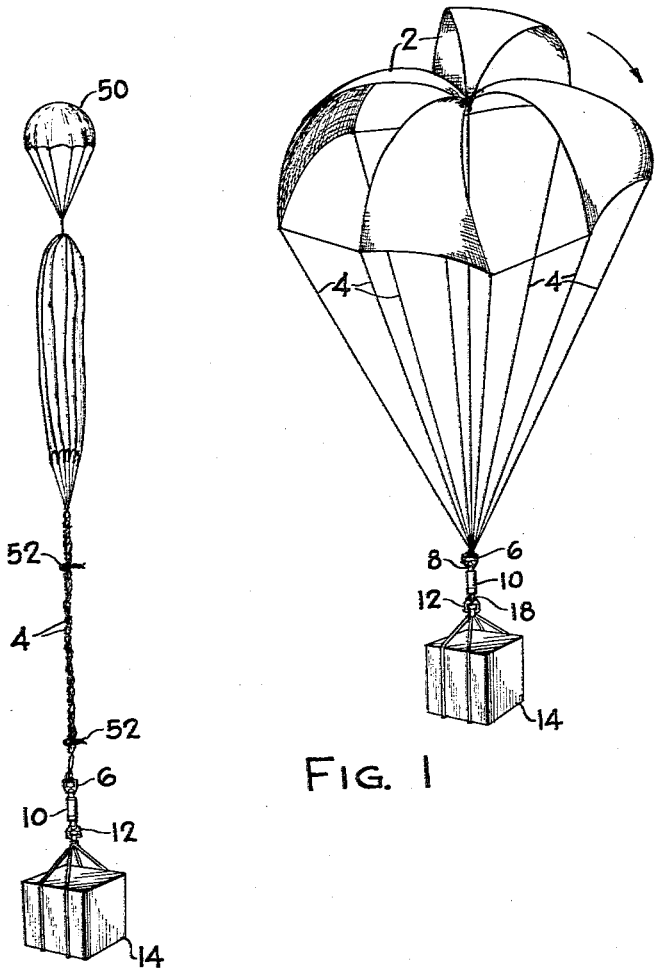

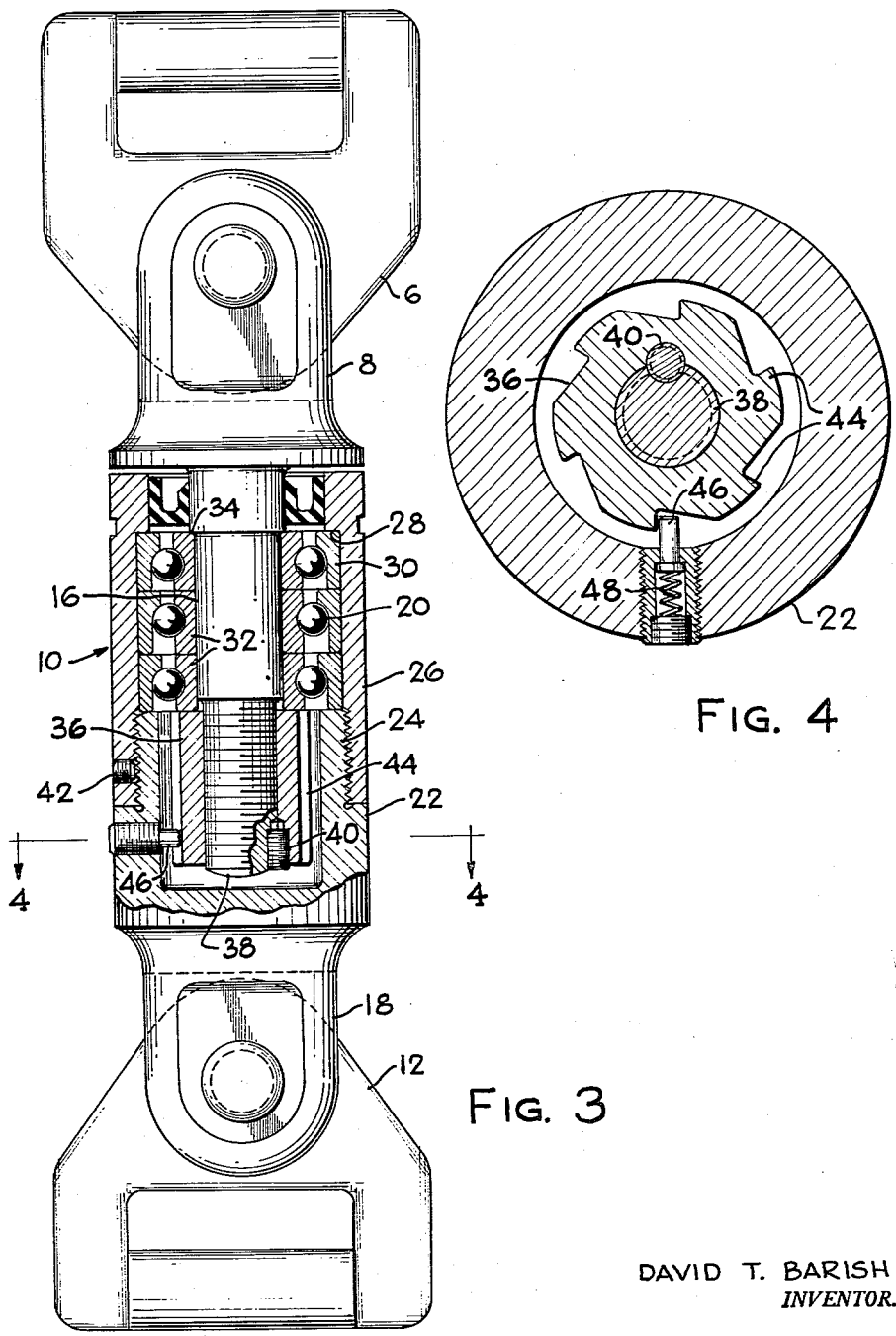

---

3,118,641
AUTO-ROTATING PARACHUTE AND SWIVEL
David T. Barish, 1435 Lexington Ave., Apt. 9-D,
New York, N.Y.
Filed Mar. 30, 1961, Ser. No. 99,470
8 Claims. (Cl. 244—142)

This invention relates to swivels and is directed particularly to auto-rotating parachutes having a swivel located between the parachute and its load and to methods of using such assemblies.

Auto-rotating parachutes are constructed so that they rotate as they descend, whereas it is not usually desirable to transmit such rotation or torque to the load. It is, therefore, usual to provide a swivel connection between the parachute and load. However, the high speeds at which auto-rotating parachutes are often used renders it desirable to delay opening and rotation of the parachute canopy until the assembly has decelerated sufficiently to assure safe deployment of the canopy and proper rotation thereof. Moreover, in order to reduce the torque applied to the load to a minimum, it is desirable to provide the swivel with anti-friction bearings which might be damaged if the elements are rotated while subjected to an excessive load.

In accordance with the present invention, the auto-rotating parachutes are designed and constructed so that they will rotate in a predetermined direction and the swivel is provided with means which permit relative rotation of the elements only in the same direction as the parachute. This combination of elements renders it possible to pack and release the parachute in a manner which serves to initiate and assure the desired rotation of the canopy. At the same time, it is possible to prevent relative rotation of the elements of the swivel until the canopy is rotating properly and the load applied to the swivel has been reduced. Thereafter the construction permits free rotation of the parachute canopy relative to the load while the anti-friction bearings reduce the torque applied to the load to a minimum.

Accordingly, the principal object of the present invention is to improve the manner of deployment and operation of auto-rotating parachutes.

Another object of the invention is to provide novel methods and means for use in packing and deploying auto-rotating parachutes which serve to initiate and assure the desired rotation of the canopy.

A further object of the invention is to provide novel means to prevent injury to the anti-friction bearings of a swivel in combination with an auto-rotating parachute.

A specific object of the invention is to provide an auto-rotating parachute with a swivel having relatively rotating parts with means for preventing undesired relative rotation of the elements of the swivel.

These and other objects and features of the present invention will appear from the following description thereof wherein referenec is made to the figures of the accompanying drawing.

In the drawing:

FIG. 1 is a diagrammatic illustration of a typical assembly embodying the present invention with the parachute omitted for clarity;

FIG. 2 is a diagrammatic illustration of the assembly of FIG. 1 as it appears following release of the parachute from an enclosure;

FIG. 3 is an enlarged view of a swivel adapted for use in the assembly of FIGS. 1 and 2 with portions of the swivel shown in longitudinal section; and FIG. 4 is a transverse sectional view of the swivel of FIG. 3 taken on the line 4—4 thereof.

In that form of the invention chosen for purposes of illustration in the drawings, the auto-rotating parachute is of the general type shown and described in my copending application filed in the United States and identified as Serial No. 684,262, now Patent No. 3,073,555. In this assembly, the parachute has a canopy embodying a plurality of circumferentially spaced panels 2 which are constructed and arranged so that upon release and during normal descent of the parachute the canopy will rotate in a predetermined direction as indicated by the arrow in FIG. 1. Suspension lines 4 extend downward from the canopy to a fitting 6 which is secured to a clevis 8 at the upper end of the swivel 10. A fitting 12 at the lower end of the swivel is adapted to be secured to the load 14 to be supported by the parachute. The clevis 8 to which the fitting 6 is connected is carried by a shank 16, whereas the fitting 12 is connected to a clevis 18 at the lower end of the swivel, and anti-friction means such as the ball bearings 20 are located between the elements so as to permit substantially free rotation of the parachute canopy formed by the panels 2 with respect to the load 14.

In that form of the swivel illustrated in FIG. 3, the clevis 18 is carried by a member 22 having an upper portion 24 in threaded engagement with a tubular housing 26. The upper end of the housing 26 is formed with a shoulder 28 against which the outer race member 30 of the uppermost anti-friction bearing assembly may be seated. The assembly as shown embodies three sets of ball bearings and the outer race of the lowermost ball bearing is engaged by the upper end of the threaded portion 24 of the element 22 so that the anti-friction bearings may be firmly secured in place. The inner race members 32 of the ball bearing assemblies engage the shank 16 to which the upper clevis 8 is connected. A shoulder 34 is formed on the shank 16 in position to be engaged by the inner race member of the uppermost bearing assembly, whereas the inner race member of the lowermost bearing assembly is engaged by the nut 36 applied to the threaded lower end 38 of the shank 16. The nut 36 may be held in place on the threaded end 38 of the shank by means of an insert screw 40 so that the nut 36 cannot rotate relative to the shank. Further, if desired, a set screw 42 may be employed to prevent relative rotation of the tubular housing 26 with respect to the lower element 22 of the swivel.

The construction thus provided permits ready assembly of the elements and assures proper positioning and retention of the anti-friction means within the assembly. In accordance with the present invention, means are provided for permitting relatively free rotation of the elements on the swivel in one direction while preventing relative rotation of the elements in the opposite direction. For this purpose, the nut 36 may be formed on its outer surface with ratchet teeth 44 engageable by a spring pressed dog or ratchet member 46. The dog 46 is urged into engagement with the ratchet teeth by means of a spring 48 and serves to permit substantially free relative rotation of the shank 16 and nut 36 in a clockwise direction as indicated by the arrow shown in FIG. 1, whereas relative counter-clockwise rotation of the shank 16 and fitting 6 is prevented by engagement of the dog 46 with the ratchet teeth 44 on the nut 36.

Since the parachute canopy is constructed and designed to rotate in a predetermined direction, for instance in a clockwise direction as shown in FIG. 1, the swivel is connected to the suspension lines 4 of the canopy in such a way as to permit free rotation of the fitting 6, clevis 8 and shank 16 in a clockwise direction while preventing relative clockwise direction of the lower elements of the swivel and of the load attached thereto.

In using the assembly described, the parachute is packed for deployment in a suitable pack, container or enclosure. A pilot chute 50 is preferably attached to the peak or central portion of the parachute canopy and the pilot chute and canopy are folded or arranged in any preferred manner for stowage.

During the packing operation, the suspension lines 4 are twisted in a direction opposite to that in which the parachute canopy is designed to rotate during normal descent. Thus, if the canopy is constructed and arranged for normal clockwise rotation during descent, the suspension lines are given a counter-clockwise twist—from about 5 to 15 turns of the suspension lines generally being sufficient.

Thereafter when the parachute is released, it is drawn from its pack or enclosure by the pilot chute and is extended to the position shown diagrammatically in FIG. 2. When so extended, the pilot chute and canopy impose a drag on the suspension lines and the assembly, therefore, starts to decelerate. As a result, the twisted suspension lines are subjected to tension and tend to straighten out or unwind. However, the ratchet means in the swivel 10 prevents rotation of the ends of the suspension lines attached to the swivel and load and since the mass of the load will always be substantially greater than that of the parachute canopy, substantially all of the torque or untwisting forces are exerted on the canopy. The canopy, therefore, is caused to start rotating in a clockwise direction before the panels thereof have spread to their deployed positions. In fact, the panels are held in and prevented from immediate deployment by the twisted suspension lines. They can only spread and extend to their final positions as the suspension lines unwind. Accordingly, the parachute canopy is caused to open relatively gradually and is caused to rotate as it opens.

In this way, sufficient time is allowed for the assembly to decelerate considerably and the panels of the parachute canopy are caused to open gradually and in a manner which serves to assure the proper deployment and positioning of the panels to develop the most effective aerodynamic or vortex ring action for controlled descent of the parachute and its load. At the same time, rotation of the canopy in the desired direction is initiated so as to facilitate the proper deployment and positioning of the panels of the canopy.

When it is anticipated that the parachute will be released at very high speeds, or at any time it is deemed desirable, the twisted lines may be tied with one or more break threads 52 or other restraining means may be applied thereto so as to delay or slow down the untwisting of the suspension lines and prevent premature or too rapid opening and deployment of the panels of the parachute canopy.

By the time the suspension lines 4 have untwisted, the canopy will be fully and properly deployed and will be rotating in its intended direction and manner for normal operation and descent. The shank 16 and the nut 36 secured to the lower end thereof will then be free to rotate with a minimum of resistance in a clockwise direction so that little or no torque is applied to the load. At the same time, undesired relative rotation of the elements of the swivel is prevented and the elements are restrained against rotation until the canopy has been fully deployed and the assembly has decelerated sufficiently to assure that the load applied to the anti-friction means in the swivel has been materially reduced. In this way, the anti-friction means are protected from damage due to rotation of the parts under excessive load.

The swivel employed may be relatively small, light and inexpensive in construction while being capable of withstanding the severe loads and forces frequently encountered during the initial stages of deployment and shock loading of the parachute canopy. On the other hand, the manner of packing and releasing the assembly with the suspension lines twisted in a direction to initiate the desired rotation of the canopy serves to prolong and reduce the shock loading and aids in the proper deployment of the parachute.

While the construction shown and described employs a single ratchet and dog means for preventing undesired relative rotation of the swivel elements, any desired number of such dogs may be provided for engagement with the ratchet member and any other suitable or preferred one-way drive connection may be interposed between the relatively rotating parts of the swivel. Moreover, the various elements of the swivel and the type of antifriction bearing means employed are capable of wide variation in the practice of the present invention. In view thereof, it should be understood that the particular embodiment of the invention shown in the drawings and described above is intended to be illustrative only and is not intended to limit the scope of the invention.

I claim:

1. In combination with an auto-rotating parachute and its load, suspension lines extending from the parachute canopy to said load and connected thereto, said suspension lines being twisted in one direction prior to deployment of the parachute canopy whereby the application of tension to the suspension lines upon deployment of the parachute canopy will tend to cause said suspension lines to untwist and initiate rotation of the parachute canopy in the opposite direction and with respect to the load.

2. An auto-rotating parachute having a canopy constructed and arranged to rotate in a predetermined direction during normal descent of the parachute, suspension lines connected to said canopy, a swivel having relatively rotatable parts one of which is connected to said suspension lines and another of which is formed for attachment of a load thereto, and means interposed between said parts of the swivel permitting relative rotation thereof in said predetermined direction only.

3. An auto-rotating parachute having a canopy constructed and arranged to rotate in a predetermined direction during normal descent of the parachute, suspension lines connected to said canopy, a swivel having relatively rotatable parts one of which is connected to said suspension lines and another of which is formed for attachment of a load thereto, and ratchet means interposed between said parts of the swivel and arranged to permit relative rotation of said parts in said predetermined direction only.

4. The combination as defined in claim 2 wherein the suspension lines are twisted during packing in a direction opposite to that in which the canopy is designed to rotate during normal descent.

5. The combination as defined in claim 4 wherein restraining means are applied to the twisted suspension lines.

6. The combination as defined in claim 2 wherein antifriction means are interposed between the relatively rotatable parts of the swivel.

7. An auto-rotating parachute having a canopy embodying a plurality of circumferentially spaced panels constructed and arranged to cause the canopy to rotate in a predetermined direction during normal descent of the parachute, a pilot chute attached to the canopy, said pilot chute and canopy being folded for stowage preparatory to release of the parachute, suspension lines connected to the canopy, a swivel having a part to which the suspension lines are attached and a part to which a load may be secured, the suspension lines being twisted in a direction opposite to that in which the canopy is designed to rotate during normal descent of the parachute, and means engaging said parts of the swivel opposing relative rotation thereof in a direction opposite to that in which the parachute canopy is designed to rotate.

8. The combination set forth in claim 7 wherein break threads are applied to the twisted suspension lines.

References Cited in the file of this patent

UNITED STATES PATENTS

| | | |
|---|---|---|
| 537,800 | Bouquet et al. | Apr. 16, 1895 |
| 907,574 | Danzinger | Dec. 22, 1908 |
| 2,701,697 | Ewing | Feb. 8, 1955 |
| 2,724,567 | Adams | Nov. 22, 1955 |
| 2,811,378 | Kalista | Oct. 29, 1957 |
| 2,949,266 | Sepp | Aug. 16, 1960 |

FOREIGN PATENTS

| | | |
|---|---|---|
| 780,754 | Great Britain | Aug. 7, 1957 |